(12) United States Patent
Tai

(10) Patent No.: US 6,882,774 B2
(45) Date of Patent: Apr. 19, 2005

(54) WAVELENGTH DIVISION MULTIPLEXING COUPLER

(75) Inventor: Shu Lin Tai, San Jose, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 152 days.

(21) Appl. No.: 10/310,412

(22) Filed: Dec. 4, 2002

(65) Prior Publication Data

US 2004/0109640 A1 Jun. 10, 2004

(51) Int. Cl.[7] .................................................. G02B 6/32
(52) U.S. Cl. ........................................................ 385/33
(58) Field of Search .............................. 385/24, 33, 34; 398/85, 88

(56) References Cited

U.S. PATENT DOCUMENTS 6,396,980 B1 * 5/2002 Liu et al. ...................... 385/34
6,701,041 B1 * 3/2004 Kagami et al. ............... 385/34

* cited by examiner

Primary Examiner—Karl D. Frech
Assistant Examiner—Jamara A. Franklin
(74) Attorney, Agent, or Firm—Wei Te Chung

(57) ABSTRACT

An improved wavelength division multiplexing (WDM) coupler includes a dual fiber collimator assembly (27), a filter device (29), and a single fiber collimator assembly (31). The filter device comprises a holder (26) and a filter (24) received therein. The holder has a first opening (21) and a second opening (23) communicating therewith. The holder firmly secures both the dual fiber collimator assembly and the single fiber collimator assembly therein. A relative position and orientation of a first GRIN lens (22) and the filter can be adjusted during assembly by sliding the first GRIN lens in or out of and by microtilting the GRIN lens in the second opening while monitoring reflection insertion loss. A DWM coupler which is more easily adjusted during assembly and which has a more stable structure is thus obtained.

14 Claims, 4 Drawing Sheets

WAVELENGTH DIVISION MULTIPLEXING COUPLER

BACKGROUND OF THE INVENTION

1. Field of the Invention

This invention generally relates to a wavelength division multiplexing (WDM) coupler, and more particularly to a WDM coupler which is adjustable during assembly and which has a stable structure after assembly.

2. Related Art

In optical fiber technology, wavelength division multiplexing (WDM) couplers are used to combine or separate optical signals having different wavelengths. As WDM couplers are being more broadly applied in the telecommunications, data communications and cable television (CATV) industries, WDM couplers having higher levels of performance and reliability are required.

A WDM coupler comprises two collimator assemblies and a filter member. To minimize transmission losses of light signals, distances between and relative orientations of the two collimator assemblies and the filter member have to be fixed precisely.

Referring to FIG. 4, a conventional WDM coupler disclosed in U.S. Pat. No. 6,343,166 comprises two collimator assemblies (not labeled), a filter 624, and a filter holder 626. The filter 624 is partially received in the filter holder 626 to form a filter subassembly (not labeled). An aperture 627 within the filter holder 626 extends between the filter 624 and lens 622. The filter subassembly is aligned with the two collimator assemblies to transmit light signals having a preselected wavelength and to reflect all other. However, the filter holder 626 has a predetermined structure and the aperture 627 has a predetermined length, which limits readjustments of the distance between the filter 624 and the lens 622.

Another conventional WDM coupler is disclosed in U.S. Pat. No. 6,282,339. Although the disclosed coupler also has two collimator assemblies and a filter, the filter is directly attached to a face of a collimating lens using adhesive. The adhesive can act as a contaminant between the lens and filter, which can cause problems.

An improved WDM coupler which is efficiently adjustable during assembly and which has a stable structure after assembly is desired to overcome the above-mentioned problems.

SUMMARY OF THE INVENTION

Accordingly, an object of the present invention is to provide an improved WDM coupler which is efficiently adjustable during assembly and which has a stable structure after assembly.

To achieve the above-mentioned objects, a wavelength division multiplexing (WDM) coupler comprises a dual fiber collimator assembly, a filter device, and a single fiber collimator assembly. The dual fiber collimator assembly comprises a dual fiber ferrule and a first GRIN lens. The filter device comprises a holder and a filter received therein. The holder has a first opening at one end and a second opening at another end which communicates with the first opening. The single fiber collimator assembly comprises a single fiber ferrule and a second GRIN lens. A metal ring surrounding an end of the first GRIN lens is used to engage with the second opening of the holder, thereby helping to fix alignment of the first GRIN lens with the filter. A relative position between the first GRIN lens and the filter is adjusted during assembly to obtain optimal optical performance, and then the first GRIN lens is secured in the holder, fixing that relative position. Next, an end of the second GRIN lens is secured in the first opening of the holder, while signals transmitted from the first GRIN lens to the second GRIN lens are monitored to assure a minimum insertion loss of no greater than about 0.3 dB. A DWM coupler having a more stable structure is thus obtained. The DWM coupler is also more easily adjusted during assembly than those of the prior art.

Other objects, advantages and novel features of the present invention will be drawn from the following detailed description of a preferred embodiment of the present invention.

DETAILED DESCRIPTION OF THE INVENTION

Figure 1:
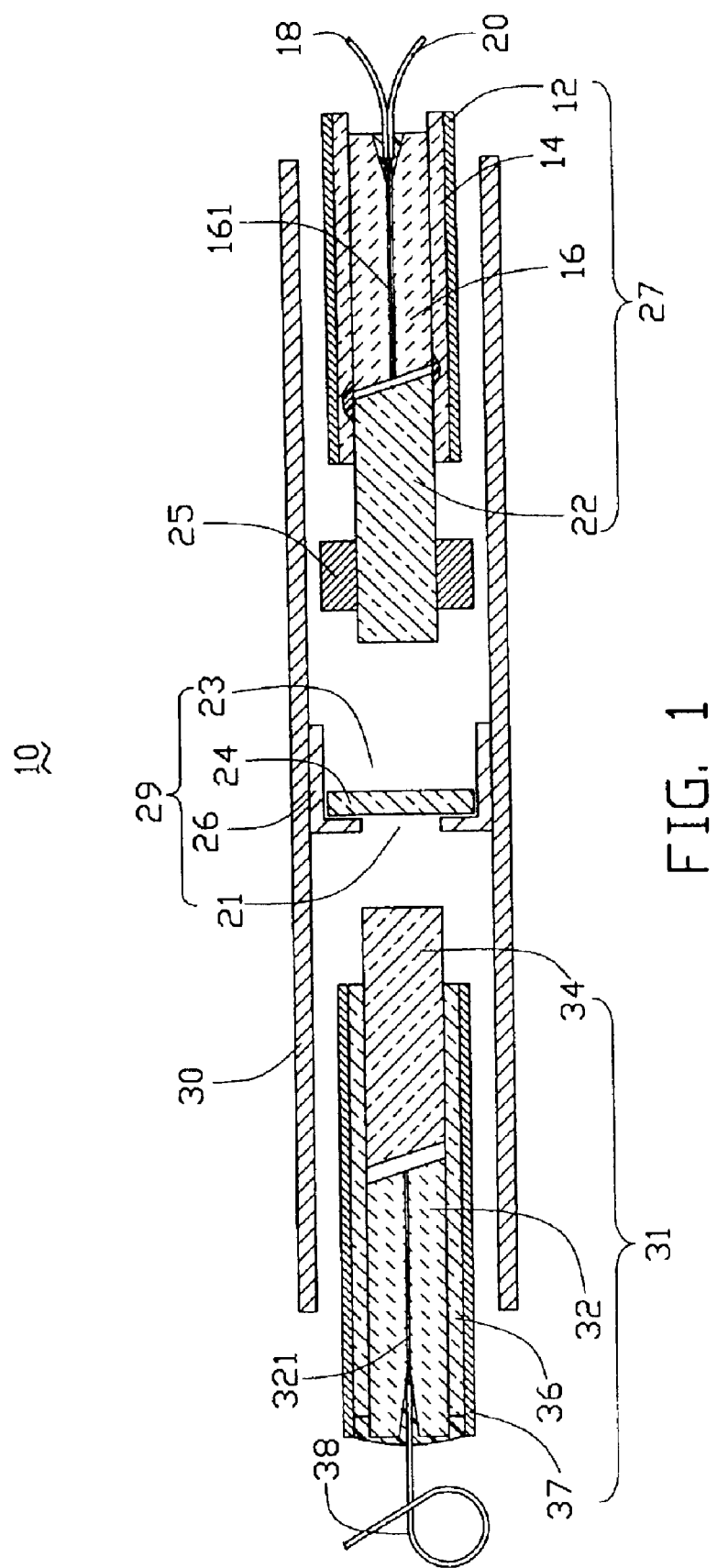
FIG. 1 is a cross-sectional view of an incompletely assembled wavelength division multiplexing (WDM) coupler according to a preferred embodiment of the invention.
Figure 2:
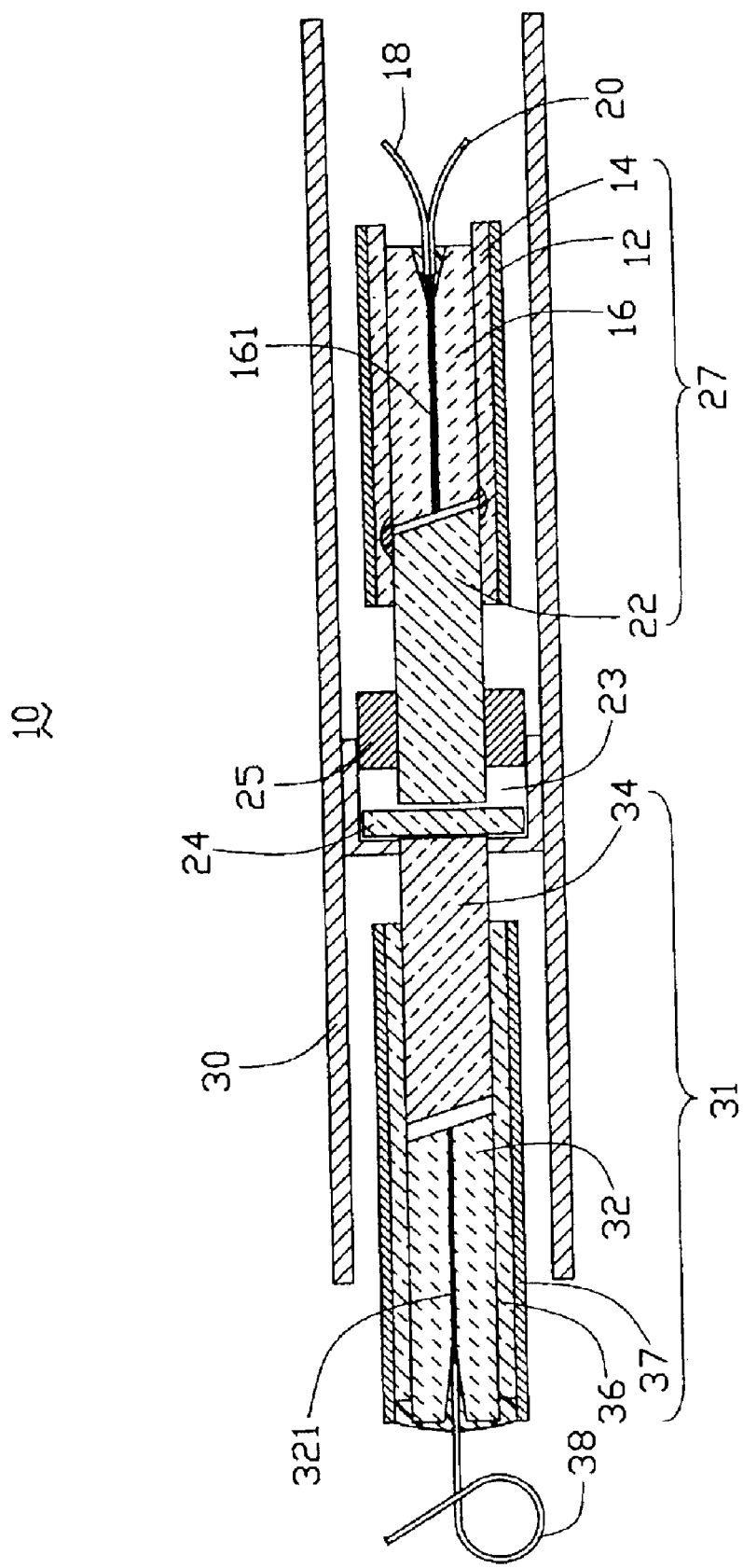
FIG. 2 is a cross-sectional view of the assembled WDM coupler of FIG. 1.

Referring to FIG. 1 and FIG. 2, there is shown a wavelength division multiplexing (WDM) coupler 10. The WDM coupler 10 comprises a dual fiber collimator assembly 27, a single fiber collimator assembly 31 and a filter device 29. The filter device 29 is arranged between the dual fiber collimator assembly 27 and the single fiber collimator assembly 31. A metal tube 30 surrounds the dual fiber collimator assembly 27, the filter device 29 and the single fiber collimator assembly 31 to fix them therein.

The dual fiber collimator assembly 27 comprises a dual glass ferrule 16, a first graded index (GRIN) lens 22, a glass tube 14, and a metal housing 12. The dual glass ferrule 16 has a left end (not labeled) and a right end (not labeled) and defines a passageway 161 therebetween. The passageway 161 receives an input optical fiber 18 and a reflective optical fiber 20 therein. The left end of the ferrule 16 together with ends of the input optical fiber 18 and the reflective optical fiber 20 held within the ferrule 16 is polished at a 7 to 8 degree angle with respect to a plane constructed perpendicular to a longitudinal axis of the dual fiber collimator assembly 27. A right end of the first GRIN lens 22 is ground at an angle identical to that of the left end of the ferrule 16 and is spaced a predetermined distance from the left end of the ferrule 16. The dual glass ferrule 16 and the first GRIN lens 22 are aligned and fixed in the glass tube 14 and the glass tube 14 is surrounded by the metal housing 12 for further protection. A left end portion of the first GRIN lens 22 is exposed outside the metal housing 12 and a metal ring 25 surrounds the first GRIN lens 22 at the left end thereof.

Figure 3:
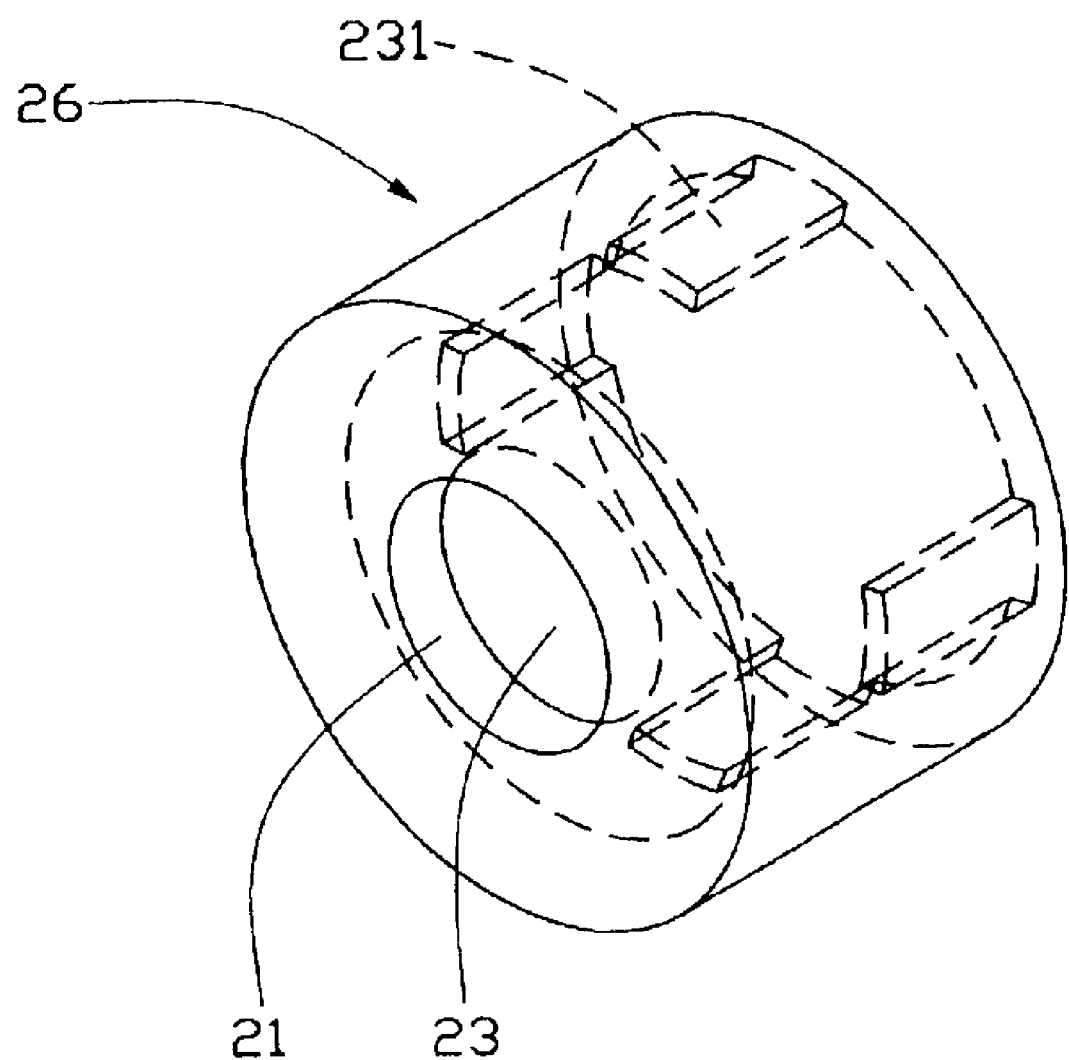
FIG. 3 is a perspective view of a filter holder used in the WDM coupler of FIG. 1.
Figure 4:
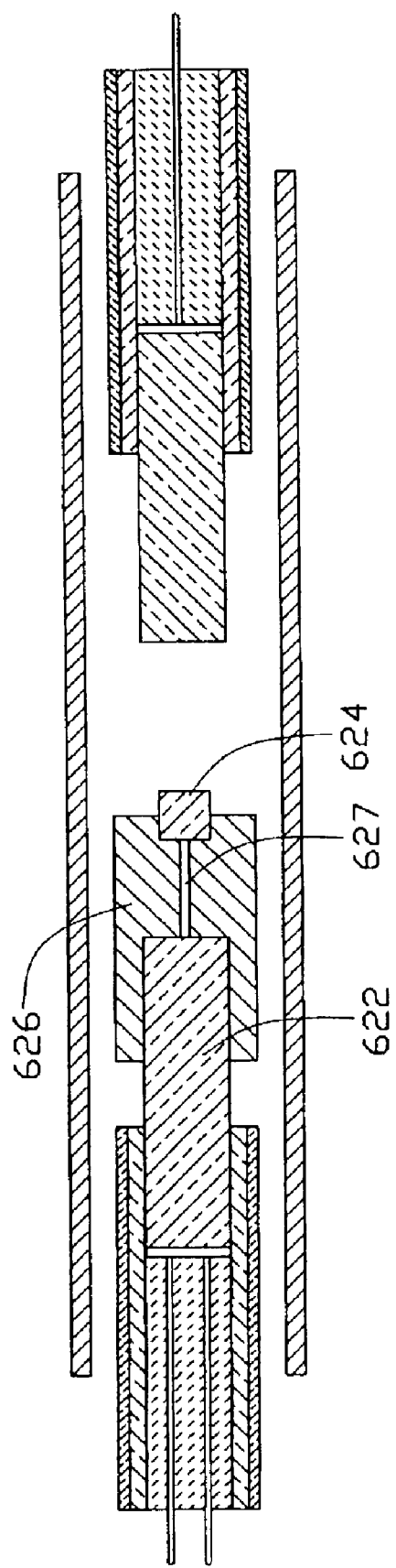
FIG. 4 is a cross-sectional view of a three-port filter assembly of the prior art.

The filter device 29 comprises a holder 26 and a filter 24. The holder 26 receives the filter 24 at one end and is engaged with the metal ring 25 at the other end. Referring to FIG. 3, the holder 26 is cylindrically-shaped and has a tubular sidewall (not labeled), an open right end (not labeled), and an annular-shaped left end (not labeled) which defines a first opening 21 through its center. The open right end and an inside of the holder 26 will be designated as a second opening 23. The first opening 21 is in communication with the second opening 23. A diameter of the first opening 21 is smaller than a diameter of the second opening 23. The filter 24 is attached to an inside wall (not labeled) of the annular-shaped left end, adjacent to and covering the first opening 21. An outer diameter of the filter 24 is smaller than the diameter of the second opening 23 and bigger than the diameter of the first opening 21, such that light from the first GRIN lens 22 passes through the filter 24 and the first opening 21 to the single fiber collimator assembly 31. The second opening 23 receives and is engaged with the metal ring 25 surrounding the first GRIN lens 22. An outer diameter of the metal ring 25 is smaller than the diameter of the second opening 23 so that the dual fiber collimator assembly 27 can be adjusted up and down, back and forth, and can be tilted in a certain range. A plurality of slots 231 is defined inside the open right end of the holder 26, which is advantageous to dispose adhesive to secure the metal ring 25.

The single fiber collimator assembly 31 comprises a single glass ferrule 32, a second GRIN lens 34, a glass tube 36 and a metal housing 37. The single glass ferrule 32 has a left end (not labeled) and a right end (not labeled) and defines a passageway 321 therebetween. The passageway 321 receives an output optical fiber 38. The right end of the ferrule 32 together with the end of the output optical fiber 38 held within the ferrule 32 is polished at a 7 to 8 degree angle with respect to a plane constructed perpendicular to a longitudinal axis of the single fiber collimator assembly 31. The left end of the second GRIN lens 34 is ground at an angle identical to that of the right end of the ferrule 32 and is spaced a predetermined distance from the right end of the ferrule 32. The single glass ferrule 32 and the second GRIN lens 34 are aligned and fixed in the glass tube 36 and the glass tube 36 is surrounded by the metal housing 37 for further protection. A right end portion of the GRIN lens 34 is exposed outside the glass tube 36 and the metal housing 37.

In assembly, the filter 24 is attached to the inside wall of the annular-shaped left end of the holder 26, adjacent to and covering the first opening 21 using silicon adhesive. The dual fiber collimator assembly 27 and single fiber collimator assembly 31 are also assembled using adhesives. The first GRIN lens 22 surrounded by the metal ring 25 is then inserted into the second opening 23 of the holder 26 after the dual fiber collimator assembly 27 is properly assembled and secured by silicon adhesive. A relative position and annular orientation between the first GRIN lens 22 and the filter 24 is adjusted while signals transmitted from the input optical fiber 18 to the reflective optical fiber 20 are being monitored. When a position and orientation is achieved at which monitored reflection insertion losses are at a minimum, the holder 26 is fixed to the metal ring 25 using silicon adhesive injected into the slots 231. The dual fiber collimator assembly 27 with the attached filter device 29 is then,positioned in the metal tube 30. Then the single fiber collimator assembly 31 is inserted into the tube 30 and is aligned with and inserted into the first opening 21. The orientation and position of the single fiber collimator assembly 31 is adjusted relative to the filter 24 while the signals transmitted through the input optical fiber 18 to the output optical fiber 38 are being monitored. When indicated insertion losses are minimized at a value no greater than about 0.3 dB, the dual fiber collimator assembly 27 with the filter device 29 and the single fiber collimator assembly 31 are secured within the metal tube 30.

In operation, light signals are transmitted from the input optical fiber 18 through the first GRIN lens 22, collimates the light signals. Light signals of a wavelength determined by the properties of the filter 24 passes through the filter 24. All other wavelengths are reflected back through the GRIN lens 22 and are coupled into the reflective optical fiber 20. The light signals passes by the filter 24 are coupled into the output optical fiber 38.

Compared with a WDM coupler of the prior art, the WDM coupler 10 is easier to adjust and to align during assembly. The distance between the first GRIN lens 22 and the filter 24 can be adjusted to be shorter than that indicated by the U.S. Pat. No. 6,343,166, and this should result in a lower value of insertion losses and in greater thermal stability. Furthermore, unlike the U.S. Pat. No. 6,282,339, contamination of the first GRIN lens 22 is avoided since the filter 24 is not attached to the first GRIN lens 22. Moreover, the first GRIN lens 22 can be micro-adjusted to align with the filter 24 at different angular orientations, thereby further lowering return losses. The right end of the second GRIN lens 34 snuggly fits into the first opening 21 of the holder 26, so that the second GRIN lens 34 is firmly secured by the holder 26 at one end. A DWM coupler having a more stable structure is thus obtained, and this DWM coupler is easy to adjust during assembly. Furthermore, the holder 26 and the metal ring 25 are both made of metal having excellent conductivity, which is advantageous for the thermal stability of the WDM coupler 10.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

I claim:

1. A wavelength division multiplexing (WDM) coupler comprising:

a dual fiber collimator assembly having a dual fiber ferrule and a first graded index (GRIN) lens having a proximal end and a distal end, the proximal end opposing the dual fiber ferrule and a metal ring encircling the distal end of the first GRIN lens;

a filter device having a holder and a filter, the holder defining a first opening and a second opening in communication with the first opening, a diameter of the first opening being smaller than that of the second opening, the filter being secured inside the holder and covering the first opening; and a single fiber collimator assembly having a single fiber ferrule and a second GRIN lens;

wherein an end of the second GRIN lens is inserted into and secured in the first opening of the holder and the first GRIN lens is received in the holder with the metal ring engaging with the second opening of the holder.

2. The WDM coupler of claim 1, wherein the holder has an annular-shaped end in which the first opening is defined, and the filter is attached to an inside wall of the annular-shaped end, covering the first opening.

3. The WDM coupler of claim 2, wherein an outer diameter of the filter is smaller than the diameter of the second opening and bigger than the diameter of the first opening.

4. The WDM coupler of claim 1, wherein an outer diameter of the metal ring is smaller than the diameter of the second opening, thereby allowing micro-adjustment of the position and orientation of the dual fiber collimator assembly with respect to the filter and the holder.

5. The WDM coupler of claim 4, wherein the metal ring is secured within the second opening of the holder by silicon adhesive.

6. The WDM coupler of claim 5, wherein a plurality of slots is defined on inside walls of the holder and the silicon adhesive is imposed on the metal ring via the plurality of slots.

7. A wavelength division multiplexing (WDM) coupler comprising:
   a single fiber collimator assembly having a single fiber ferrule and a second GRIN lens aligned therewith, the single fiber ferrule receiving an output fiber;
   a filter device having a holder and a filter received therein, the holder defining a first opening and a second opening in communication with the first opening, the diameter of the first opening being smaller than that of the second opening;
   a dual fiber collimator assembly having a first GRIN lens and a dual fiber ferrule aligned therewith, the dual fiber ferrule further comprising an input optical fiber and a reflective optical fiber;
   wherein an end of the first GRIN lens is held in the second opening of the holder, an end of the second GRIN lens is received in the first opening of the holder, and the second opening has internal dimensions which allow micro-adjustment of the position and orientation of the dual fiber collimator assembly with respect to the holder and filter.

8. The WDM coupler of claim 7, wherein the dual fiber collimator assembly further comprises a metal ring surrounding the end of the first GRIN lens so that the metal ring engages with the second opening of the holder to secure the end of the first GRIN lens.

9. The WDM coupler of claim 8, wherein an outer diameter of the metal ring is smaller than the diameter of the second opening, allowing micro-adjustment of the dual fiber collimator assembly with respect to the holder and filter.

10. The WDM coupler of claim 7, wherein an end of the second GRIN lens is inserted and secured in the first opening of the holder.

11. The WDM coupler of claim 7, wherein the holder of the filter device defines a plurality of slots in walls thereof, the slots communicating with the second opening.

12. A WDM device comprising:
    a first collimator having a first ferrule and a first GRIN lens;
    a second collimator having a second ferrule and a second GRIN lens oppositely facing the first GRIN lens;
    a holder disposed between said first GRIN lens and said second GRIN lens, said holder defining a first opening receiving a front end of the first GRIN lens, and a second opening larger than said first opening, said first opening receiving therein a ring which receives a front end of the second GRIN lens therein; and
    a filter received in the holder and closely located in front of the front end of said first GRIN lens while relatively far spaced from the front end of the second GRIN lens.

13. The device of claim 12, wherein said front end of the second GRIN lens extends beyond the ring toward the filter in said holder.

14. The device of claim 12, wherein the first collimator, the second collimator and the holder are all enclosed in a sleeve.

* * * * *